Patented May 30, 1950

2,509,873

UNITED STATES PATENT OFFICE 2,509,873

DICARBOXYLIC ACID ANHYDRIDE PREPARATION

James Howard McAteer, Cranford, N. J., assignor to Standard Oil Development Company, a corporation of Delaware No Drawing. Application January 18, 1946, Serial No. 642,127

2 Claims. (Cl. 260—342.6)

This invention relates particularly to the preparation of an anhydride from a dicarboxylic acid which tends to undergo thermal decomposition and isomerization under ordinary dehydrating treatment. More particularly, it relates to dehydration of maleic acid to maleic anhydride and to the dehydration of similar olefinic acids such as, for example, itaconic acid and citraconic acid.

An object of this invention is to provide a method which facilitates dehydration of the acids and improve the yields of the desired anhydrides.

In accordance with the present invention, dehydration of an unsaturated dicarboxylic acid, to produce the corresponding dicarboxylic acid anhydride without substantial formation of undesired products, is effected readily by continuous removal of water of dehydration formed with the aid of an acid type catalyst, and preferably with the use of a reaction medium that assists removal of the water by distillation.

Among the members of the class of dicarboxylic acids to which the present invention more particularly relates, maleic acid is of considerable industrial importance in the form of its anhydride. Large quantities of the acid are recovered as by-product from the oxidation of naphthalene to produce phthalic anhydride. Because, however, of the difficulties and expense involved in the dehydration of maleic acid to its anhydride by previously known processes, it has frequently been the practice to discard this valuable by-product.

Maleic acid (cis-butenedioic acid) undergoes thermal decomposition into maleic anhydride and water at about 135° C. under atmospheric pressure. It has long been known that the maleic acid, when subjected to conditions necessary for dehydration at a practical rate, isomerizes extensively to fumaric acid (the trans-isomer) which is stable and which, therefore, represents a direct loss in yield of maleic anhydride. Moreover, the isomerization is not restricted to the undiluted form of the acid but, also, occurs when aqueous solutions of the acid are heated. For example, an aqueous solution of maleic acid containing more than about 40 weight per cent of the acid is unstable above about 70° C. It is also known that such solutions may be catalytically isomerized through the action of various acids and salts. In general, it may be said that the ease with which maleic acid isomerizes at a given temperature increases with the concentration of the acid in a solvent.

Various methods have been proposed in the past to minimize losses of maleic acid to undesired products during its dehydration. Thus, chemical dehydrating agents or water absorbents, such as $P_2O_5$, have been employed to some extent. This type of process, which requires the use of large proportions of a water absorbent, is not generally feasible for commercial operation. In other proposed processes, the maleic acid is subjected to rapid heating followed by flash evaporation of water vapors in order to reduce the time for isomerization. However, the various types of processes hitherto proposed have required stringent controls and have not been generally suitable for commercial operation.

I have discovered that the dehydration of maleic acid may be conveniently catalyzed with small proportions of catalysts so that it is possible to carry out the reaction under conditions which restrict the occurrence of undesired side reactions. By catalyzing the dehydration less drastic temperature conditions are required, while a rapid rate of dehydration is obtained. Furthermore, by using a catalyst and a volatile reaction medium or solvent, at the boiling temperature of the volatile medium, the reaction temperature is fixed and the reaction proceeds efficiently without requiring much attention.

The following examples will serve to demonstrate advantages of the catalytic dehydration and the efficiency of the catalytic process.

Example 1

A 500 cc. 3-necked flask which served as the reactor was fitted with a thermometer and a laboratory fractionating column condenser head equipped with a U-shaped takeoff line. A mixture of 51.5 gm. (0.44 mol) of technical grade maleic acid, 83.4 gm. (0.91 mol) of toluene and 1 cc. of 96% $H_2SO_4$ (0.018 mol $H_2SO_4$+0.004 mol $H_2O$) was placed in the reactor and heated to boiling. The mixture was refluxed for two hours during which time the condenser water and toluene were separated. The water was collected as a distillate and the toluene returned to the reactor continuously. During this time the boiling point of the toluene solution in the reactor increased from 109° C to 115° C. and the temperature of the vapors leaving the reactor increased from 105° C. to 111.5° C. At the end of the two hours the distillate amounted to 7.1 gm. (0.39 mol) of $H_2O$, 1.2 gm. (0.01 mol) of maleic acid (vaporized as maleic anhydride from the reactor) and a little toluene. The reactor contents consisted of a solution of maleic anhydride in toluene and about 7.2 gm. of toluene- and water-insoluble solids which were principally fumaric acid. Catalytic dehydration under the conditions of this example yielded about 89% of the theoretical yield of maleic anhydride and not more than 11% of fumaric acid and other by-products.

*Example 2*

In the apparatus described under Example 1, a mixture of 59.5 gm. (0.51 mol) of technical grade maleic acid and 92.6 gm. (1.01 mols) of toluene refluxed for two hours. During this time the boiling point of the toluene solution increased from 109° C. to 111.5° C. 1.7 gm. (0.1 mol) of $H_2O$ were vaporized and collected in the distillate receiver. At the end of the run there remained a large amount of toluene-insoluble solid. A portion of this was water-soluble indicating it to be unchanged maleic acid. The toluene- and water-insoluble material amounted to 12 to 14 gms. (principally fumaric acid). In the absence of a dehydration catalyst there was produced only about an 18% yield of maleic anhydride while there was formed simultaneously about 20 to 24% of fumaric acid based on the maleic acid charged.

The foregoing examples indicate the effectiveness of the addition of sulfuric acid as the catalyst, but other acid type catalysts may be employed, as, for example, sulfonic acids, phosphoric acid, acidic inorganic halides, esters of inorganic acids, and, in general, condensation type catalysts. The use of an organic medium or solvent, such as toluene or other hydrocarbons, is not required to effect the catalytic dehydration but is advantageous for obtaining automatic control of the operation while simultaneously aiding in removal of water. The solvent or liquid medium used should have preferably a boiling point in the range of 80° C. and 115° C. Other or additional measures may be employed in conjunction with the catalyst for aiding the removal of water, as, for example, the use of reduced pressures. The process of the present invention may be carried out in a batch or continuous manner. In certain applications the molten acid anhydride may be preferred to the use of a hydrocarbon medium for obtaining a high degree of control.

The present invention makes possible the use of low temperatures and a rapid rate of dehydration, both of which decrease the tendency toward conversion by side reactions. The present invention makes feasible the recovery of an anhydride from the acid which is generally formed as a by-product in the use of the anhydride. Hitherto, on account of the lack of an economical method for dehydrating the acid by-products, these by-products formed a loss.

The unsaturated dicarboxylic acid anhydrides are becoming increasingly important in the preparation of synthetic resins having a wide variety of application as plastics and surface coatings. Considerable quantities of maleic anhydride are annually consumed for such purposes. Itaconic acid anhydride resins show considerable promise as modifiers in the methacrylate types of resins. In addition to these uses the acid anhydrides are of value as chemical intermediates in the synthesis of esters and other types of organic compounds.

It is to be understood that variations in the catalytic dehydrating procedure come within the spirit and scope of the invention.

I claim:

1. The method of dehydrating maleic acid to its anhydride, which comprises forming a reaction mixture of maleic acid with toluene and a small catalytic amount of sulfuric acid, heating the reaction mixture to boiling, continuously distilling from the reaction mixture toluene together with water formed by dehydration of the maleic acid at 80° C. to 115° C., separating water distillate from toluene distillate, and returning toluene distillate to the reaction mixture.

2. The method of dehydrating maleic acid to its anhydride which comprises forming a mixture of maleic anhydride with an inert liquid hydrocarbon medium boiling in the range of 80° C. to 115° C. and with a small catalytic amount of an acidic condensation catalyst, splitting out water, and distilling simultaneously from the mixture the water of dehydration entrained in the vapors of the said liquid hydrocarbon medium continuously until maleic anhydride is obtained as a residue.

JAMES HOWARD McATEER.

REFERENCES CITED

The following references are of record in the file of this patent:

UNITED STATES PATENTS

| Number | Name | Date |
|---|---|---|
| 2,134,531 | Punnett | Oct. 25, 1938 |
| 2,166,556 | Spence et al. | July 18, 1939 |
| 2,211,160 | Punnett | Aug. 13, 1940 |
| 2,288,460 | Kane et al. | June 30, 1942 |
| 2,309,167 | Cooper | Jan. 26, 1943 |

OTHER REFERENCES

Synthetic Org. Chemicals, Carbide and Carbon (1940) pages 8 and 30.